United States Patent
Chen et al.

(10) Patent No.: US 11,715,259 B2
(45) Date of Patent: Aug. 1, 2023

(54) METHOD AND APPARATUS FOR GENERATING VIRTUAL AVATAR, DEVICE AND STORAGE MEDIUM

(71) Applicant: BEIJING BAIDU NETCOM SCIENCE AND TECHNOLOGY CO., LTD., Beijing (CN)

(72) Inventors: Ruizhi Chen, Beijing (CN); Chen Zhao, Beijing (CN)

(73) Assignee: BEIJING BAIDU NETCOM SCIENCE AND TECHNOLOGY CO., LTD., Beijing (CN)

(*) Notice: Subject to any disclaimer, the term of this patent is extended or adjusted under 35 U.S.C. 154(b) by 62 days.

(21) Appl. No.: 17/249,714

(22) Filed: Mar. 10, 2021

(65) Prior Publication Data
US 2021/0375042 A1 Dec. 2, 2021

(30) Foreign Application Priority Data
Jun. 2, 2020 (CN) .......................... 202010490847.8

(51) Int. Cl.
*G06T 17/00* (2006.01)
*G06T 7/40* (2017.01)
(Continued)

(52) U.S. Cl.
CPC ................ *G06T 17/00* (2013.01); *G06T 7/40* (2013.01); *G06T 17/10* (2013.01); *G06V 40/166* (2022.01); *G06V 40/169* (2022.01)

(58) Field of Classification Search
CPC .......... G06T 15/04; G06T 17/00; G06T 17/10; G06T 7/40; G06V 10/443; G06V 40/166; G06V 40/169
See application file for complete search history.

(56) References Cited

U.S. PATENT DOCUMENTS 9,799,096 B1 * 10/2017 De la Torre .......... A63F 13/655
2007/0172099 A1 * 7/2007 Park ..................... G06K 9/6234
382/218

(Continued)

FOREIGN PATENT DOCUMENTS

CN 108140020 A 6/2018
CN 109308727 A 2/2019
(Continued)

OTHER PUBLICATIONS

Wei et al., "A Real Time Face Tracking and Animation System," Proceedings of the 2004 IEEE Computer Society Conference on Computer Vision and Pattern Recognition Workshops (CVPRW'04) (Year: 2004).*

(Continued)

*Primary Examiner* — Sing-Wai Wu
(74) *Attorney, Agent, or Firm* — Knobbe, Martens, Olson & Bear, LLP

(57) ABSTRACT

Embodiments of a method and apparatus for generating a virtual avatar, a device and a storage medium are provided. The method may include: determining a template coefficient of a target face in a to-be-processed image based on at least two real face feature templates; and determining a virtual avatar of the target face according to the template coefficient and at least two virtual face feature templates associated with the at least two real face feature templates.

14 Claims, 3 Drawing Sheets

---

S110
Determining a template coefficient of a target face in a to-be-processed image based on at least two real face feature templates S120
Determining a virtual avatar of the target face according to the template coefficient and at least two virtual face feature templates associated with the at least two real face feature templates

(51) Int. Cl.
    *G06T 17/10*    (2006.01)
    *G06V 40/16*    (2022.01)

(56) References Cited

U.S. PATENT DOCUMENTS

| | | |
|---|---|---|
| 2011/0234581 A1 | 9/2011 | Eikelis et al. |
| 2013/0235045 A1 | 9/2013 | Corazza et al. |
| 2013/0243274 A1* | 9/2013 | Sukegawa .............. G06V 40/16 382/118 |
| 2014/0035934 A1* | 2/2014 | Du .......................... G06T 17/20 345/474 |
| 2015/0206004 A1* | 7/2015 | Liang ...................... G06T 7/248 382/103 |
| 2017/0206694 A1* | 7/2017 | Jiao ...................... G06V 40/174 |
| 2018/0374242 A1 | 12/2018 | Li et al. |

FOREIGN PATENT DOCUMENTS

| | | |
|---|---|---|
| CN | 110688948 A | 1/2020 |
| CN | 110766777 A | 2/2020 |
| JP | 2018-530017 | 10/2018 |
| WO | WO 2012/139276 A1 | 10/2012 |

OTHER PUBLICATIONS

Diego Thomas, "Real-time Simultaneous 3D Head Modeling and Facial Motion Capture with an RGB-D camera", arxiv.org, Cornell University Library, dated Sep. 22, 2020 in 13 pages.

Extended European Search Report received in Application No. 21161680.0, dated Sep. 28, 2021 in 9 pages.

* cited by examiner

METHOD AND APPARATUS FOR GENERATING VIRTUAL AVATAR, DEVICE AND STORAGE MEDIUM

CROSS-REFERENCE TO RELATED APPLICATIONS

This application claims priority to Chinese Application No. 202010490847.8, filed on Jun. 2, 2020 and entitled "Method and Apparatus for Generating Virtual Avatar, Device and Storage Medium," the content of which is hereby incorporated by reference in its entirety.

TECHNICAL FIELD

Embodiments of the present disclosure relate to the field of deep learning and image technology, and specifically to the field of Internet software technology. Specifically, embodiments of the present disclosure provide a method and apparatus for generating a virtual avatar, a device and a storage medium.

BACKGROUND

A technology in which a virtual avatar similar to a face feature of a single face photograph is generated based on the single face photograph is a current hot topic of the technology research and product application in the field of three-dimensional face.

At present, by matching the face feature in the photograph with a preset virtual avatar, a virtual avatar similar to the face in the photograph is determined from the preset virtual avatar.

However, the sense of reality of the virtual avatar obtained through the above method is not high.

SUMMARY

Embodiments of the present disclosure provide a method and apparatus for generating a virtual avatar, a device and a storage medium.

In a first aspect, an embodiment of the present disclosure provides a method for generating a virtual avatar, the method including: determining a template coefficient of a target face in a to-be-processed image based on at least two real face feature templates; and determining a virtual avatar of the target face according to the template coefficient and at least two virtual face feature templates associated with the at least two real face feature templates.

In a second aspect, an embodiment of the present disclosure provides an apparatus for generating a virtual avatar, the apparatus including: a coefficient determining module, configured to determine a template coefficient of a target face in a to-be-processed image based on at least two real face feature templates; and an avatar determining module, configured to determine a virtual avatar of the target face according to the template coefficient and at least two virtual face feature templates associated with the at least two real face feature templates.

In a third aspect, an embodiment of the present disclosure provides an electronic device, the device electronic including: at least one processor; and a memory communicatively connected with the at least one processor, the memory storing instructions executable by the at least one processor, and the instructions, when executed by the at least one processor, causing the at least one processor to perform the method according to any embodiment of the present disclosure.

In a fourth aspect, an embodiment of the present disclosure provides a non-transitory computer readable storage medium storing computer instructions, the computer instructions being used to cause a computer to implement the method according to any embodiment of the present disclosure.

It should be understood that the content described in this section is not intended to identify key or important features of embodiments of the present disclosure, and is not used to limit the scope of the present disclosure. Other features of the present disclosure will be easily understood through the following description.

BRIEF DESCRIPTION OF THE DRAWINGS

Accompanying drawings are used for a better understanding of the scheme, and do not constitute a limitation to embodiments of the present disclosure.

DETAILED DESCRIPTION OF EMBODIMENTS

Example embodiments of the present disclosure are described below in combination with the accompanying drawings, and various details of embodiments of the present disclosure are included in the description to facilitate understanding, and should be considered as examples only. Accordingly, it should be recognized by one of ordinary skill in the art that various changes and modifications may be made to embodiments described herein without departing from the scope and spirit of the present disclosure. Also, for clarity and conciseness, descriptions for well-known functions and structures are omitted in the following description.

According to the technical solution of embodiments of the present disclosure, it is implemented that the simulation degree of the virtual avatar is improved while virtualizing the target face.

First Embodiment

Figure 1:
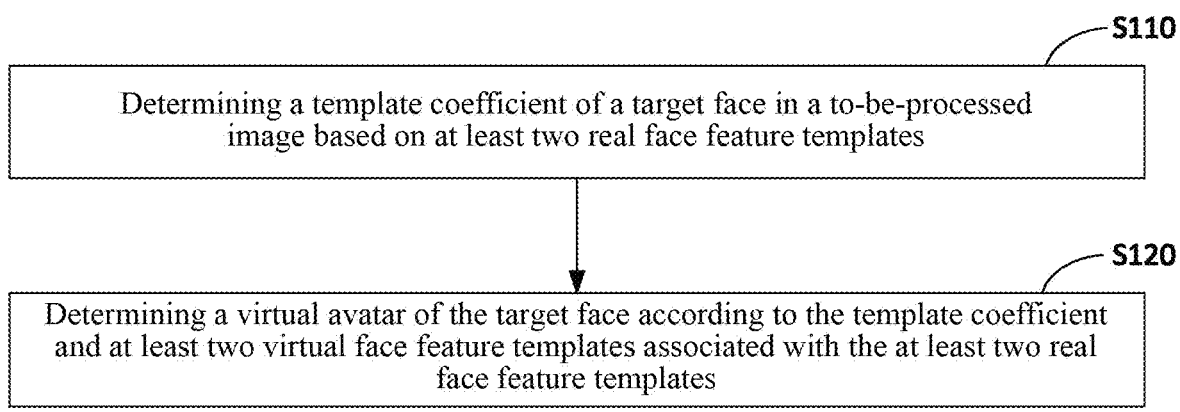
FIG. 1 is a flowchart of a method for generating a virtual avatar provided according to a first embodiment of the present disclosure.

FIG. 1 is a flowchart of a method for generating a virtual avatar provided according to the first embodiment of the present disclosure. This embodiment is applicable to a situation where a virtual avatar similar to a face feature in a face image is generated according to the face image. The method may be performed by an apparatus for generating a virtual avatar. The apparatus may be implemented by means of software and/or hardware. Referring to FIG. 1, the method for generating a virtual avatar provided in embodiments of the present disclosure includes the following steps.

S110, determining a template coefficient of a target face in a to-be-processed image based on at least two real face feature templates.

Here, a real face feature template refers to a template of a feature presented by an actual face. The template may be three-dimensional or two-dimensional.

Specifically, the real face feature template may be a feature template of a whole face, or may be a feature template of a partial face.

The at least two real face feature templates may be used to describe at least one face feature.

The face feature includes at least one of: a face expression, a face shape, or a five-sense organ.

Alternatively, the face feature may be the face expression, the face shape, or the five-sense organ.

The face feature may also be the face expression and the face shape, the face expression and the five-sense organ, or the face shape and the five-sense organ.

The face feature may also be the face expression, the face shape and the five-sense organ.

For example, the face expression may include at least one of: excitement, joy, surprise, sadness, fear, shyness, disgust, anger, or the like.

The face shape may include at least one of: a round face, a square face, a heart-shaped face, an oval face, a diamond face, or the like.

The nose may include at least one of: a standard nose, a curved nose, a straight nose, or the like.

The eye may include at least one of: a standard eye, a pendulous eye, a phoenix eye, a triangular eye, a hypertropia eye, a narrow eye, a round eye, or the like.

The eyebrow may include at least one of: a natural eyebrow, a flat straight eyebrow, a willow eyebrow, an arched eyebrow, an upward eyebrow, or the like.

The mouth may include at least one of: a standard mouth, a cherry mouth, a big mouth, a crooked mouth, or the like.

The to-be-processed image is an image for which a virtual avatar is to be generated according to the target face in the image.

The template coefficient refers to a fusion weight of a fused face having a similarity with the target face greater than a set similarity threshold obtained by fusing the at least two real face feature templates.

Specifically, the determining the template coefficient of the target face in the to-be-processed image based on the at least two real face feature templates may include: inputting the to-be-processed image into a pre-trained template coefficient identification model, and outputting the template coefficient of the target face.

Alternatively, the determining the template coefficient of the target face in the to-be-processed image based on the at least two real face feature templates may further include: extracting a feature point of the target face in the to-be-processed image; and indexing the template coefficient of the target face from data according to the extracted feature point.

S120, determining a virtual avatar of the target face according to the template coefficient and at least two virtual face feature templates associated with the at least two real face feature templates.

Here, a virtual face feature template refers to a template of a feature presented by a face of a certain style. Specifically, the style may be at least one of: sweet and lovely, natural and elegant, romantic and charming, charismatic and stylish, graceful and gentle, gorgeous and graceful, pure and concise, intellectual and calm, or modern.

The virtual face feature template may be drawn by a cartoonist according to a real face feature template.

Each real face feature template is associated with a virtual face feature template.

The virtual avatar refers to an unreal look.

Alternatively, the virtual avatar may be in a form of a three-dimensional model, or may be in a form of a two-dimensional image.

Specifically, the determining the virtual avatar of the target face according to the template coefficient and the at least two virtual face feature templates associated with the at least two real face feature templates includes: performing a weighted summation on a position of each feature point in the at least two real face feature templates according to the template coefficient; and using a weighted summation result as a position of a corresponding feature point in the virtual avatar to obtain the virtual avatar of the target face.

According to the technical solution of embodiments of the present disclosure, the virtual avatar of the target face is determined according to the template coefficient and the at least two virtual face feature templates associated with the at least two real face feature templates. A more real description for the target face may be achieved through the fitting of the at least two real face feature templates. Therefore, according to embodiments of the present disclosure, it may be implemented that the simulation degree of the virtual avatar is improved while virtualizing the target face.

Second Embodiment

Figure 2:
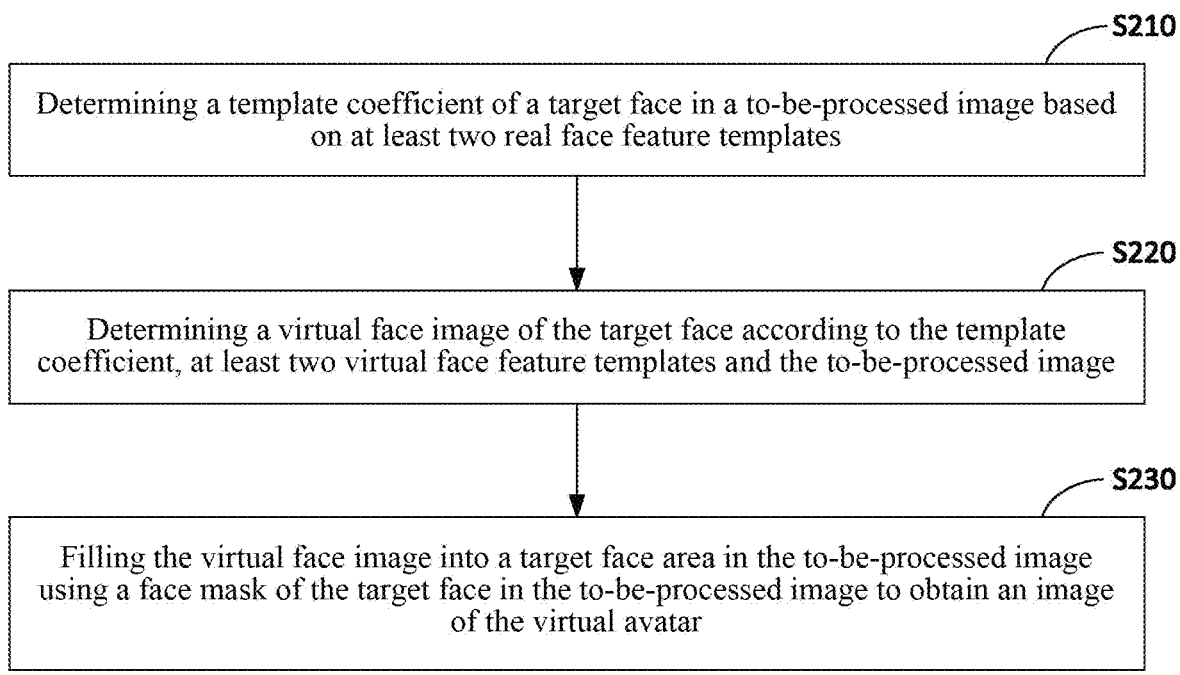
FIG. 2 is a flowchart of a method for generating a virtual avatar provided according to a second embodiment of the present disclosure.

FIG. 2 is a flowchart of a method for generating a virtual avatar provided according to the second embodiment of the present disclosure. This embodiment is a specific optimization for S120 on the basis of the above embodiment. Referring to FIG. 2, the method for generating a virtual avatar provided in embodiments of the present disclosure includes the following steps.

S210, determining a template coefficient of a target face in a to-be-processed image based on at least two real face feature templates.

S220, determining a virtual face image of the target face according to the template coefficient, at least two virtual face feature templates and the to-be-processed image.

Here, the virtual face image is a face image of a virtual avatar.

Specifically, the determining the virtual face image of the target face according to the template coefficient, the at least two virtual face feature templates and the to-be-processed image may include: determining a three-dimensional model of a virtual face according to the template coefficient and the at least two virtual face feature templates; extracting texture information of the target face from the to-be-processed image; and rendering the three-dimensional model of the virtual face according to the texture information of the target face, to obtain the virtual face image.

Here, the texture information includes at least one of color information or illumination information.

The virtual face refers to a face of a virtual avatar.

S230, filling the virtual face image into a target face area in the to-be-processed image using a face mask of the target face in the to-be-processed image to obtain an image of the virtual avatar.

According to the technical solution of embodiments of the present disclosure, the virtual face image is filled into the target face area in the to-be-processed image using the face mask of the target face in the to-be-processed image to obtain an image of the virtual avatar, such that the virtual avatar has another user feature (e.g., a hairstyle and clothing) in addition to the target face, thereby further improving the similarity between the virtual avatar and the user to which the target face belongs.

In order to further improve the similarity between the virtual face and the target face, before the filling the virtual face image into the target face area in the to-be-processed image using the face mask of the target face in the to-be-processed image to obtain the image of the virtual avatar, the method further includes: transforming the virtual face image according to a face key point of the target face to align the virtual face in the virtual face image with the target face.

Third Embodiment

Figure 3:
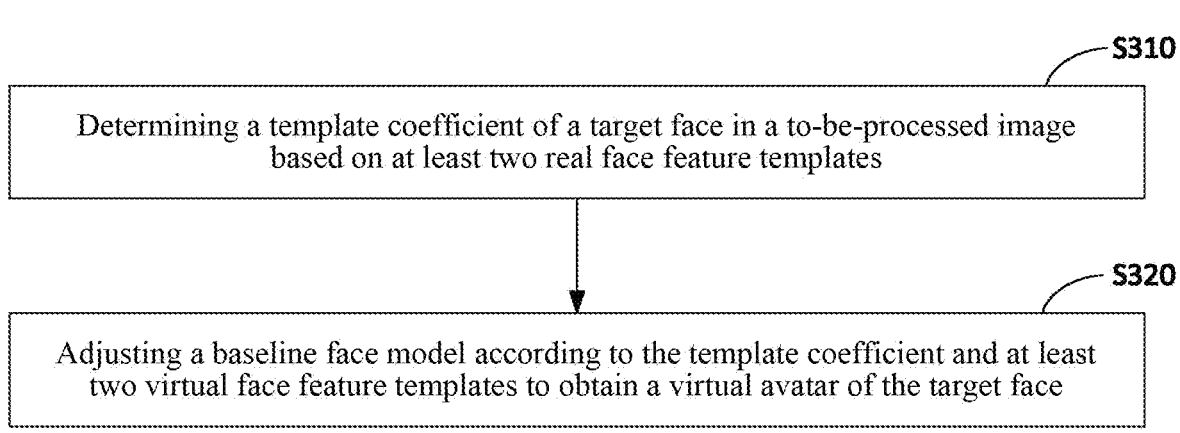
FIG. 3 is a flowchart of a method for generating a virtual avatar provided according to a third embodiment of the present disclosure.

FIG. 3 is a flowchart of a method for generating a virtual avatar provided according to the third embodiment of the present disclosure. This embodiment is a specific optimization for S120 on the basis of the above embodiment. Referring to FIG. 3, the method for generating a virtual avatar provided in embodiments of the present disclosure includes the following steps.

S310, determining a template coefficient of a target face in a to-be-processed image based on at least two real face feature templates.

S320, adjusting a baseline face model according to the template coefficient and at least two virtual face feature templates to obtain a virtual avatar of the target face.

Here, the baseline face model refers to a face model as a baseline.

The baseline refers to a calm state presented before people make different expressions.

Specifically, the adjusting the baseline face model according to the template coefficient and the at least two virtual face feature templates to obtain the virtual avatar of the target face may include: matching a face key point in each of the virtual face feature templates with a face key point in the baseline face model to obtain matching point pairs; performing a weighted summation on distances of at least two matching point pairs with associated face key point in the baseline face model according to the template coefficient; and translating the face key point in the baseline face model according to a weighted summation result to obtain the virtual avatar of the target face.

For example, the virtual avatar of the target face is determined according to the following formula:

$$x = x_0 + a(x_1 - x_0) + b(x_2 - x_0).$$

Here, x is a dimension coordinate of a feature point in the virtual avatar, $x_0$ is a corresponding dimension coordinate of a corresponding feature point in the baseline face model, $x_1$ is a corresponding dimension coordinate of a corresponding feature point in a virtual face feature template, $x_2$ is a corresponding dimension coordinate of a corresponding feature point in another virtual face feature template, and a and b are template coefficients.

According to the technical solution of embodiments of the present disclosure, the obtained virtual avatar of the target face is constrained through the baseline face model, which avoids the distortion of the virtual avatar and improves the accuracy of the virtual avatar.

Fourth Embodiment

Figure 4:
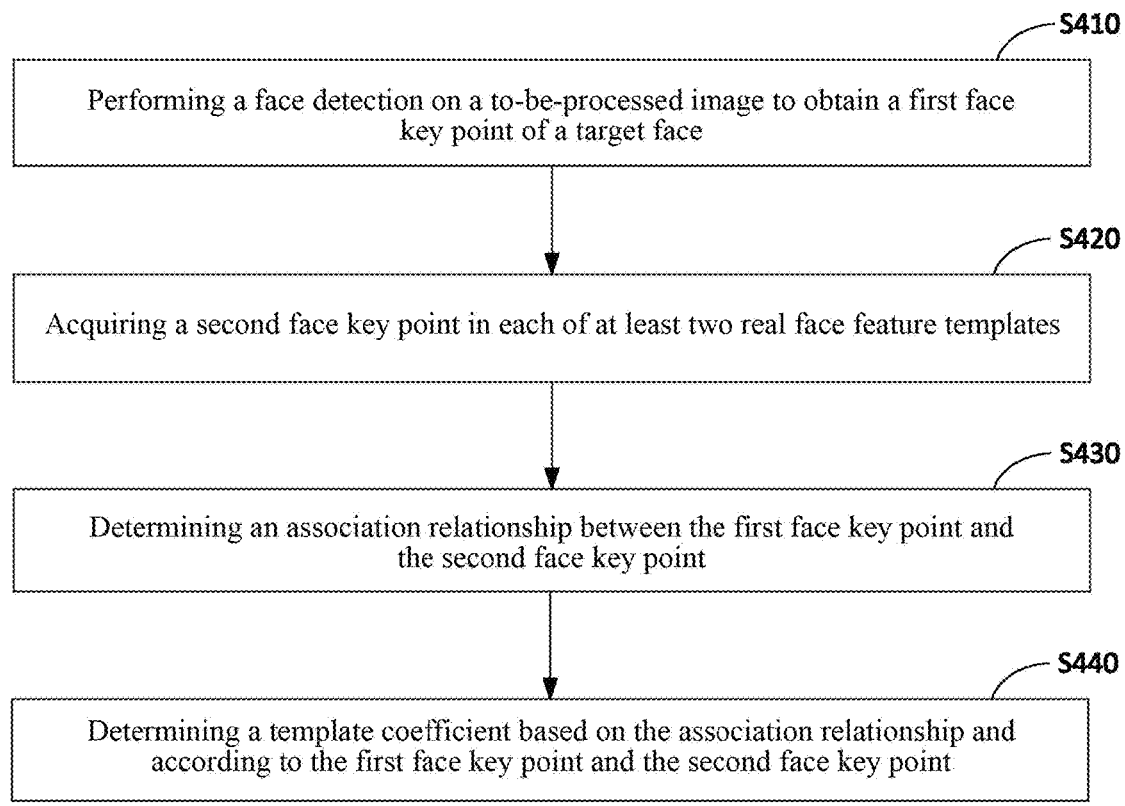
FIG. 4 is a flowchart of a method for generating a virtual avatar provided according to a fourth embodiment of the present disclosure.

FIG. 4 is a flowchart of a method for generating a virtual avatar provided according to the fourth embodiment of the present disclosure. This embodiment is a specific optimization for S110 on the basis of the above embodiment. Referring to FIG. 4, the method for generating a virtual avatar provided in embodiments of the present disclosure includes the following steps.

S410, performing a face detection on a to-be-processed image to obtain a first face key point of a target face.

Here, the first key point is a key point of the target face in the to-be-processed image.

S420, acquiring a second face key point in each of at least two real face feature templates.

Here, the second key point refers to a key point of a face in each of the real face feature templates.

S430, determining an association relationship between the first face key point and the second face key point.

Here, a face key point is a feature point representing a face key position.

Typically, the face key point is a key point at a set face position. The set face position may be at least one of: a center point position of an eye, a nose tip position, or a mouth corner position.

Specifically, the association relationship between the first face key point and the second face key point may be established according to feature information describing a face.

For example, an association relationship is established between a first face key point and a second face key point that describe an eye corner position of a left eye in a face.

S440, determining a template coefficient based on the association relationship and according to the first face key point and the second face key point.

Specifically, the determining the template coefficient based on the association relationship and according to the first face key point and the second face key point includes: establishing an equation group based on the association relationship; and substituting the first face key point and the second face key point into the equation group to solve the template coefficient.

According to the technical solution of embodiments of the present disclosure, the association relationship between the first face key point and the second face key point is determined, and the template coefficient is determined based on the association relationship and according to the first face key point and the second face key point. Thus, the determination of the template coefficient is implemented.

Fifth Embodiment

Figure 5:
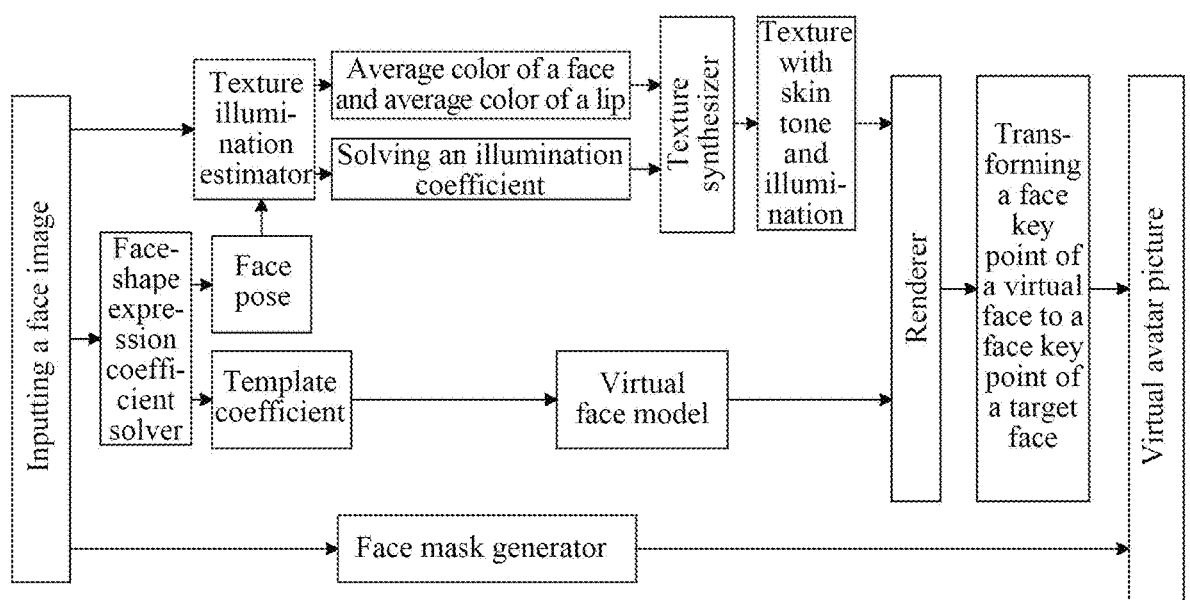
FIG. 5 is a flowchart of a method for generating a virtual avatar provided according to a fifth embodiment of the present disclosure.

FIG. 5 is a flowchart of a method for generating a virtual avatar provided according to the fifth embodiment of the present disclosure. This embodiment is an alternative scheme proposed on the basis of the above embodiment. Referring to FIG. 5, the method for generating a virtual avatar provided in embodiments of the present disclosure includes: inputting a to-be-processed image into a face-shape expression coefficient solver and outputting a template coefficient of a target face and pose information of the target face; inputting the pose information of the target face and the to-be-processed image into a texture illumination estimator, and outputting an average color of the target face, an average color of a lip in the target face and illumination information; inputting the average color of the target face, the average color of the lip in the target face and the illumination information into a texture synthesizer, and outputting a target texture map; adjusting a baseline face model according to the template coefficient to obtain a three-dimensional model of a virtual face; rendering the three-dimensional model of the virtual face using the target texture map, to obtain a virtual face image; transforming the virtual face image according to a face key point of the target face in the to-be-processed image; determining a face mask of the target face according to the to-be-processed image; filling the transformed virtual face image into a target face area in the to-be-processed image based on the face mask; and using an image obtained through the filling as a virtual avatar of the target face.

Here, the face-shape expression coefficient solver may be implemented based on a perspective transformation (perspective-n-point, PNP) method of a face feature point, or may be implemented through a deep learning approach.

The template coefficient may include at least one of: an expression template coefficient, a face-shape template coefficient, or a five-sense-organ template coefficient.

Specifically, both the texture illumination estimator and the texture synthesizer may be implemented according to the deep learning approach.

According to the technical solution of embodiments of the present disclosure, an expression template, a face-shape template and a five-sense-organ template of the virtual face are combined based on the template coefficient, to obtain the virtual avatar matching the face in the image. Thus, it is implemented that the simulation degree of the virtual avatar is improved while performing the virtualization.

Sixth Embodiment

Figure 6:
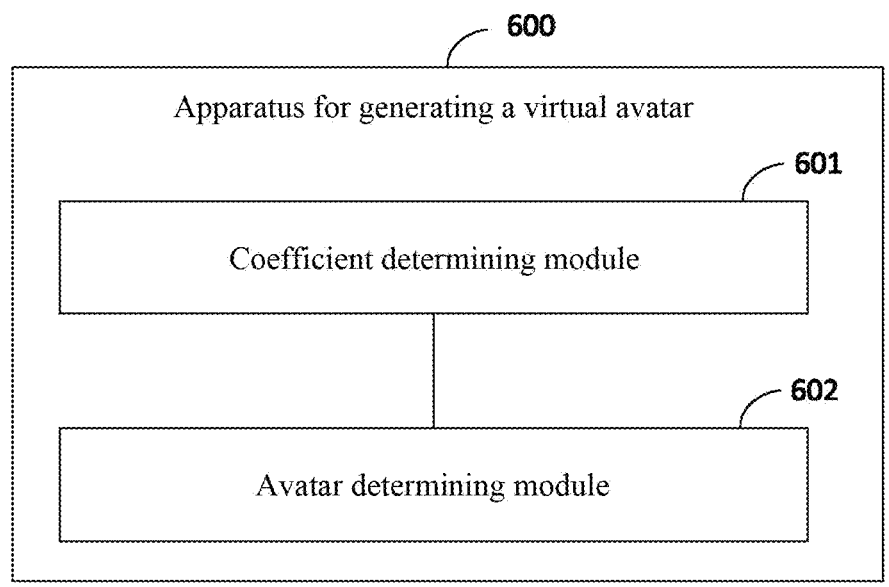
FIG. 6 is a schematic structural diagram of an apparatus for generating a virtual avatar provided according to a sixth embodiment of the present disclosure.

FIG. 6 is a schematic structural diagram of an apparatus for generating a virtual avatar provided according to the sixth embodiment of the present disclosure. Referring to FIG. 6, the apparatus for generating a virtual avatar provided in embodiments of the present disclosure includes a coefficient determining module 601 and an avatar determining module 602.

Here, the coefficient determining module 601 is configured to determine a template coefficient of a target face in a to-be-processed image based on at least two real face feature templates.

The avatar determining module 602 is configured to determine a virtual avatar of the target face according to the template coefficient and at least two virtual face feature templates associated with the at least two real face feature templates.

According to the technical solution of embodiments of the present disclosure, the virtual avatar of the target face is determined according to the template coefficient and the at least two virtual face feature templates associated with the at least two real face feature templates. A more real description for the target face may be achieved through the fitting of the at least two real face feature templates. Therefore, according to embodiments of the present disclosure, it may be implemented that the simulation degree of the virtual avatar is improved while virtualizing the target face.

Further, the avatar determining module includes: an image determining unit, configured to determine a virtual face image of the target face according to the template coefficient, the at least two virtual face feature templates and the to-be-processed image; an area filling unit, configured to fill the virtual face image into a target face area in the to-be-processed image using a face mask of the target face in the to-be-processed image; and an avatar obtaining unit, configured to use an image obtained through the filling as the virtual avatar.

Further, the image determining unit includes: a model determining subunit, configured to determine a three-dimensional model of a virtual face according to the template coefficient and the at least two virtual face feature templates; an information extracting subunit, configured to extract texture information of the target face from the to-be-processed image; and a rendering subunit, configured to render the three-dimensional model of the virtual face according to the texture information of the target face, to obtain the virtual face image.

Further, the avatar determining module includes: a model adjusting unit, configured to adjust a baseline face model according to the template coefficient and the at least two virtual face feature templates; and an avatar determining unit, configured to use a new face model obtained through the adjusting as the virtual avatar of the target face.

Further, the model adjusting unit includes: a matching subunit, configured to match a face key point in each of the virtual face feature templates with a face key point in the baseline face model to obtain matching point pairs; a weighting subunit, configured to perform a weighted summation on distances of at least two matching point pairs with associated face key point in the baseline face model according to the template coefficient; and a translating subunit, configured to translate the face key point in the baseline face model according to a weighted summation result.

Seventh Embodiment

According to embodiments of the present disclosure, the present disclosure further provides an electronic device and a readable storage medium.

Figure 7:
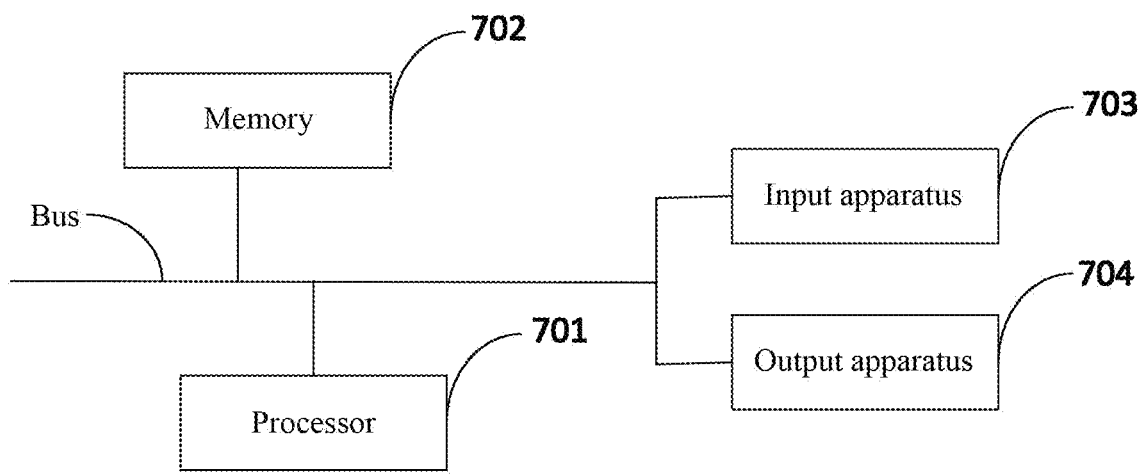
FIG. 7 is a block diagram of an electronic device of a method for generating a virtual avatar according to embodiments of the present disclosure.

As shown in FIG. 7, FIG. 7 is a block diagram of an electronic device of a method for generating a virtual avatar according to embodiments of the present disclosure. The electronic device is intended to represent various forms of digital computers such as a laptop computer, a desktop computer, a workstation, a personal digital assistant, a server, a blade server, a mainframe computer, and other appropriate computers. The electronic device may also represent various forms of mobile apparatuses such as a personal digital processor, a cellular telephone, a smart phone, a wearable device and other similar computing apparatuses. The parts shown herein, their connections and relationships, and their functions are only as examples, and not intended to limit implementations of the present disclosure as described and/or claimed herein.

As shown in FIG. 7, the electronic device includes: one or more processors 701, a memory 702, and interfaces for connecting various components, including high-speed interfaces and low-speed interfaces. The various components are connected to each other using different buses, and may be installed on a common motherboard or in other methods as needed. The processor may process instructions executed within the electronic device, including instructions stored in or on the memory to display graphic information of GUI on an external input/output apparatus (such as a display device coupled to the interface). In other embodiments, a plurality of processors and/or a plurality of buses may be used together with a plurality of memories and a plurality of memories if desired. Similarly, a plurality of electronic devices may be connected, and the devices provide some necessary operations, for example, as a server array, a set of blade servers, or a multi-processor system. In FIG. 7, one processor 701 is used as an example.

The memory 702 is a non-transitory computer readable storage medium provided by embodiments of the present disclosure. The memory stores instructions executable by at least one processor, so that the at least one processor performs the method for generating a virtual avatar provided by embodiments of the present disclosure. The non-transitory computer readable storage medium of embodiments of the present disclosure stores computer instructions for causing a computer to perform the method for generating a virtual avatar provided by embodiments of the present disclosure.

The memory 702, as a non-transitory computer readable storage medium, may be used to store non-transitory software programs, non-transitory computer executable programs and modules, such as program instructions/modules (for example, the coefficient determining module 601 and the avatar determining module 602 as shown in FIG. 6) corresponding to the method for generating a virtual avatar in embodiments of the present disclosure. The processor 701 executes the non-transitory software programs, instructions, and modules stored in the memory 702 to execute various functional applications and data processing of the server, that is, to implement the method for generating a virtual avatar in the foregoing method embodiments.

The memory 702 may include a storage program area and a storage data area, where the storage program area may store an operating system and an application program required by at least one function; and the storage data area may store data created by the electronic device for performing the method for generating a virtual avatar. In addition, the memory 702 may include a high-speed random access memory, and may also include a non-transitory memory, such as at least one magnetic disk storage device, a flash memory device, or other non-transitory solid-state storage devices. In some embodiments, the memory 702 may optionally include memories remotely provided with respect to the processor 701, and these remote memories may be connected to the electronic device suitable for performing the method for generating a virtual avatar through a network. Examples of the above network include but are not limited to the Internet, intranet, local area network, mobile communication network, and combinations thereof.

The electronic device for performing the method for generating a virtual avatar may further include: an input apparatus 703 and an output apparatus 704. The processor 701, the memory 702, the input apparatus 703, and the output apparatus 704 may be connected through the bus or in other methods. In FIG. 7, connection through the bus is used as an example.

The input apparatus 703 may receive input digital or character information, and generate key signal inputs related to user settings and function control of the electronic device for performing the method for generating a virtual avatar, such as touch screen, keypad, mouse, trackpad, touchpad, pointing stick, one or more mouse buttons, trackball, joystick and other input apparatuses. The output apparatus 704 may include a display device, an auxiliary lighting apparatus (for example, LED), a tactile feedback apparatus (for example, a vibration motor), and the like. The display device may include, but is not limited to, a liquid crystal display (LCD), a light emitting diode (LED) display, and a plasma display. In some embodiments, the display device may be a touch screen.

Various implementations of the systems and techniques described herein may be implemented in a digital electronic circuit system, an integrated circuit system, an application specific integrated circuit (ASIC), computer hardware, firmware, software, and/or combinations thereof. These various implementations may include the implementation in one or more computer programs. The one or more computer programs may be executed and/or interpreted on a programmable system including at least one programmable processor, and the programmable processor may be a dedicated or general-purpose programmable processor, may receive data and instructions from a storage system, at least one input apparatus and at least one output apparatus, and transmit the data and the instructions to the storage system, the at least one input apparatus and the at least one output apparatus.

These computing programs, also referred to as programs, software, software applications or codes, include a machine instruction of the programmable processor, and may be implemented using a high-level procedural and/or an object-oriented programming language, and/or an assembly/machine language. As used herein, the terms "machine readable medium" and "computer readable medium" refer to any computer program product, device and/or apparatus (e.g., a magnetic disk, an optical disk, a storage device and a programmable logic device (PLD)) used to provide a machine instruction and/or data to the programmable processor, and include a machine readable medium that receives the machine instruction as a machine readable signal. The term "machine readable signal" refers to any signal used to provide the machine instruction and/or data to the programmable processor.

To provide an interaction with a user, the systems and techniques described here may be implemented on a computer having a display apparatus (e.g., a cathode ray tube (CRT)) or an LCD monitor) for displaying information to the user, and a keyboard and a pointing apparatus (e.g., a mouse or a track ball) by which the user may provide the input to the computer. Other kinds of apparatuses may also be used to provide the interaction with the user. For example, a feedback provided to the user may be any form of sensory feedback (e.g., a visual feedback, an auditory feedback, or a tactile feedback); and an input from the user may be received in any form, including acoustic, speech, or tactile input.

The systems and techniques described here may be implemented in a computing system (e.g., as a data server) that includes a backend part, implemented in a computing system (e.g., an application server) that includes a middleware part, implemented in a computing system (e.g., a user computer having a graphical user interface or a Web browser through which the user may interact with an implementation of the systems and techniques described here) that includes a frontend part, or implemented in a computing system that includes any combination of the backend part, the middleware part or the frontend part. The parts of the system may be interconnected by any form or medium of digital data communication (e.g., a communication network). Examples of the communication network include a local area network (LAN), a wide area network (WAN) and Internet.

The computer system may include a client and a server. The client and the server are generally far from each other and generally interact through the communication network. The relationship between the client and the server is generated by computer programs that run on the corresponding computer and have a client-server relationship with each other. The server may be a cloud server, also known as a cloud computing server or a cloud host, and is a host product in a cloud computing service system, so as to solve the defects of difficult management and weak service extendibility existing in conventional physical hosts and VPS services.

According to the technical solution of embodiments of the present disclosure, it is implemented that the simulation degree of the virtual avatar is improved while virtualizing the target face.

It should be understood that the various forms of processes shown above may be used to resort, add or delete steps. For example, the steps described in embodiments of the present disclosure may be performed in parallel, sequentially, or in a different order. As long as the desired result of the technical solution disclosed in embodiments of the present disclosure can be achieved, no limitation is made herein.

Embodiments do not constitute a limitation to the scope of protection of the present disclosure. It should be appreciated by those skilled in the art that various modifications, combinations, sub-combinations and substitutions may be made depending on design requirements and other factors. Any modifications, equivalents and replacements, and improvements falling within the spirit and the principle of embodiments of the present disclosure should be included within the scope of protection of the present disclosure.

What is claimed is:

1. A method for generating a virtual avatar, comprising:
   extracting a feature point of a target face in a to-be-processed image, and indexing a template coefficient of the target face from data according to the feature point, wherein the template coefficient of the target face in the to-be-processed image is obtained by fusing at least two real face feature templates and the template coefficient is a fusion weight of a fused face having a similarity with the target face greater than a set similarity threshold, wherein a real face feature template in the at least two real face feature templates is a template of a feature presented by an actual face, and the at least two real face feature templates are used to describe at least one kind of face feature, wherein kinds of face features include: a face expression, a face shape, and a five-sense organ; and
   determining a virtual avatar of the target face according to the template coefficient and at least two virtual face feature templates associated with the at least two real face feature templates, comprising:
      determining a three-dimensional model of a virtual face according to the template coefficient and the at least two virtual face feature templates;
      estimating, from the to-be-processed image, an average color of the target face, an average color of a lip in the target face, and illumination information;
      synthesizing the average color of the target face, the average color of the lip in the target face, and the illumination information, to obtain a target texture map; and
      rendering the three-dimensional model of the virtual face using the target texture map, to obtain a virtual face image.

2. The method according to claim 1, wherein the determining the virtual avatar of the target face according to the template coefficient and the at least two virtual face feature templates associated with the at least two real face feature templates further comprises:
   filling the virtual face image into a target face area in the to-be-processed image using a face mask of the target face in the to-be-processed image;
   transforming the virtual face image according to a face key point of the target face to align a virtual face in the virtual face image with the target face; and
   using an image obtained through the filling and transforming as the virtual avatar.

3. The method according to claim 1, wherein the determining the virtual avatar of the target face according to the template coefficient and at least two virtual face feature templates associated with the at least two real face feature templates comprises:
   adjusting a baseline face model according to the template coefficient and the at least two virtual face feature templates; and
   using a new face model obtained through the adjusting as the virtual avatar of the target face.

4. The method according to claim 3, wherein the adjusting the baseline face model according to the template coefficient and the at least two virtual face feature templates comprises:
   matching a face key point in each of the at least two virtual face feature templates with a face key point in the baseline face model, to obtain at least two matching point pairs associated with the face key point in the baseline face model, and to obtain a distance of each matching point pair associated with the face key point in the baseline face model, wherein the distance of each matching point pair associated with the face key point in the baseline face model is a distance between the face key point in each of the at least two virtual face feature templates and the face key point in the baseline face model;
   performing a weighted summation on distances of the at least two matching point pairs associated with the face key point in the baseline face model according to the template coefficient, to obtain a weighted summation result; and
   translating the face key point in the baseline face model according to the weighted summation result.

5. The method according to claim 1, wherein a virtual face feature template in the at least two virtual face feature templates associated with the at least two real face feature templates is drawn according to a real face feature template in the at least two real face feature templates.

6. The method according to claim 1, wherein the determining a virtual avatar of the target face according to the template coefficient and at least two virtual face feature templates associated with the at least two real face feature templates comprises:
   performing, according to the template coefficient, a weighted summation on positions of feature points in the at least two real face feature templates corresponding to a feature point in the virtual avatar; and
   using a weighted summation result as a position of the feature point in the virtual avatar to obtain the virtual avatar of the target face.

7. An electronic device, comprising:
   at least one processor; and
   a memory communicatively connected with the at least one processor,
   the memory storing instructions executable by the at least one processor, and the instructions, when executed by the at least one processor, causing the at least one processor to perform operations, the operations comprising:
      extracting a feature point of a target face in a to-be-processed image, and indexing a template coefficient of the target face from data according to the feature point, wherein the template coefficient of the target face in the to-be-processed image is obtained by fusing at least two real face feature templates and the template coefficient is a fusion weight of a fused face having a similarity with the target face greater than a set similarity threshold, wherein a real face feature template in the at least two real face feature templates is a template of a feature presented by an actual face, and the at least two real face feature templates are used to describe at least one kind of face feature, wherein kinds of face features include: a face expression, a face shape, and a five-sense organ; and determining a virtual avatar of the target face according to the template coefficient and at least two virtual face feature templates associated with the at least two real face feature templates, comprising:

determining a three-dimensional model of a virtual face according to the template coefficient and the at least two virtual face feature templates;

estimating, from the to-be-processed image, an average color of the target face, an average color of a lip in the target face, and illumination information;

synthesizing the average color of the target face, the average color of the lip in the target face, and the illumination information, to obtain a target texture map; and rendering the three-dimensional model of the virtual face using the target texture map, to obtain a virtual face image.

8. The electronic device according to claim 7, wherein the determining the virtual avatar of the target face according to the template coefficient and the at least two virtual face feature templates associated with the at least two real face feature templates further comprises:

filling the virtual face image into a target face area in the to-be-processed image using a face mask of the target face in the to-be-processed image;

transforming the virtual face image according to a face key point of the target face to align a virtual face in the virtual face image with the target face; and using an image obtained through the filling and transforming as the virtual avatar.

9. The electronic device according to claim 7, wherein the determining the virtual avatar of the target face according to the template coefficient and at least two virtual face feature templates associated with the at least two real face feature templates comprises:

adjusting a baseline face model according to the template coefficient and the at least two virtual face feature templates; and using a new face model obtained through the adjusting as the virtual avatar of the target face.

10. The electronic device according to claim 9, wherein the adjusting the baseline face model according to the template coefficient and the at least two virtual face feature templates comprises:

matching a face key point in each of the at least two virtual face feature templates with a face key point in the baseline face model, to obtain at least two matching point pairs associated with the face key point in the baseline face model, and to obtain a distance of each matching point pair associated with the face key point in the baseline face model, wherein the distance of each matching point pair associated with the face key point in the baseline face model is a distance between the face key point in each of the at least two virtual face feature templates and the face key point in the baseline face model;

performing a weighted summation on distances of the at least two matching point pairs associated with the face key point in the baseline face model according to the template coefficient, to obtain a weighted summation result; and translating the face key point in the baseline face model according to the weighted summation result.

11. A non-transitory computer readable storage medium storing computer instructions, the computer instructions, when executed by a computer, cause the computer to perform operations, the operations comprising:

extracting a feature point of a target face in a to-be-processed image, and indexing a template coefficient of the target face from data according to the feature point, wherein the template coefficient of the target face in the to-be-processed image is obtained by fusing at least two real face feature templates and the template coefficient is a fusion weight of a fused face having a similarity with the target face greater than a set similarity threshold, wherein a real face feature template in the at least two real face feature templates is a template of a feature presented by an actual face, and the at least two real face feature templates are used to describe at least one kind of face feature, wherein kinds of face features include: a face expression, a face shape, and a five-sense organ; and determining a virtual avatar of the target face according to the template coefficient and at least two virtual face feature templates associated with the at least two real face feature templates, comprising:

determining a three-dimensional model of a virtual face according to the template coefficient and the at least two virtual face feature templates;

estimating, from the to-be-processed image, an average color of the target face, an average color of a lip in the target face, and illumination information;

synthesizing the average color of the target face, the average color of the lip in the target face, and the illumination information, to obtain a target texture map; and rendering the three-dimensional model of the virtual face using the target texture map, to obtain a virtual face image.

12. The non-transitory computer readable storage medium according to claim 11, wherein the determining the virtual avatar of the target face according to the template coefficient and the at least two virtual face feature templates associated with the at least two real face feature templates further comprises:

filling the virtual face image into a target face area in the to-be-processed image using a face mask of the target face in the to-be-processed image;

transforming the virtual face image according to a face key point of the target face to align a virtual face in the virtual face image with the target face; and using an image obtained through the filling and transforming as the virtual avatar.

13. The non-transitory computer readable storage medium according to claim 11, wherein the determining the virtual avatar of the target face according to the template coefficient and at least two virtual face feature templates associated with the at least two real face feature templates comprises:

adjusting a baseline face model according to the template coefficient and the at least two virtual face feature templates; and using a new face model obtained through the adjusting as the virtual avatar of the target face.

14. The non-transitory computer readable storage medium according to claim 13, wherein the adjusting the baseline face model according to the template coefficient and the at least two virtual face feature templates comprises:

matching a face key point in each of the at least two virtual face feature templates with a face key point in the baseline face model, to obtain at least two matching point pairs associated with the face key point in the baseline face model, and to obtain a distance of each matching point pair associated with the face key point in the baseline face model, wherein the distance of each matching point pair associated with the face key point in the baseline face model is a distance between the face key point in each of the at least two virtual face feature templates and the face key point in the baseline face model;

performing a weighted summation on distances of the at least two matching point pairs associated with the face key point in the baseline face model according to the template coefficient, to obtain a weighted summation result; and translating the face key point in the baseline face model according to the weighted summation result.

* * * * *